UNITED STATES PATENT OFFICE.

WILLIAM P. KOOKOGEY, OF BROOKLYN, ASSIGNOR TO THE KOOKOGEY ELECTRIC COMPANY, OF NEW YORK, N. Y.

GALVANIC-BATTERY COMPOUND.

SPECIFICATION forming part of Letters Patent No. 413,345, dated October 22, 1889.

Application filed December 14, 1886. Serial No. 221,555. (No specimens.)

*To all whom it may concern:*

Be it known that I, WILLIAM P. KOOKOGEY, of the city of Brooklyn, county of Kings, and State of New York, have invented a new and useful Improvement in Galvanic - Battery Compounds, of which the following is a specification.

My invention relates to an excitant for galvanic batteries, and is composed of bisulphate of soda and trioxide of chromium, produced by the mixture, with the aid of heat, of bichromate of soda with sulphuric acid and sulphate of soda, which is subsequently converted into a battery solution by dissolving in water, as will be hereinafter more fully explained.

Where bichromate of sodium is used in a battery solution, the disposition of the sulphate of sodium is not so important as in the case of bichromate of potassium, because of the extreme solubility of the resulting salts of sodium. My present object is to form the substance into a hard compound, which can be made into a solution by dissolving this compound in water. The necessity for making the solution in this form arises chiefly from the expense and difficulty of transporting liquids containing acids, even though a slight loss may arise by the presence of the base in the solution, which loss, however, I reduce to a minimum by using bichromate of sodium.

By the use of bichromate of soda I am enabled to get a dry chemical or mechanical mixture of bisulphate of soda and trioxide of chromium, the bichromate having the same base as the sulphate, (sodium.) Both of them are converted into bisulphate by the action of a portion of the sulphuric acid, the remaining portion of the acid serving to convert the chromium of the bichromate into trioxide, thus producing a homogeneous mixture of bisulphate of soda and trioxide of chromium.

The bichromate of soda is the only bichromate, so far as I am aware, that will form a dry battery compound and make the product which is the subject of this invention, and I hereby disclaim the use of all other bichromates for that purpose. Further, the bichromate of soda when mixed with the sulphate of soda to form the compound herein described is the only bichromate that will, if converted into a compound, leave no substance in the subsequent solution detrimental to the action of the battery.

By the present formula I am enabled to get a strong acid compound, which needs but the addition of water to make it a strong solution of chromium trioxide and acid, constituting a most valuable depolarizing-battery excitant. This result I accomplish in the following manner: To one pint, by measure, of hot sulphuric acid I add eight ounces avoirdupois of sulphate of soda, and when dissolved add slowly, stirring, twenty ounces of bichromate of soda. While these proportions may be varied, I have found them to be preferable. The compound thus formed may be allowed to cool in any suitable vessel, when a mass consisting of a coarse and nearly dry crystalline substance will be obtained, consisting of a mixture of bisulphate of soda and trioxide of chromium.

I am aware that bichromate of soda can be decomposed by the direct action of sulphuric acid; but such decomposition does not produce the product herein described, where concentrated acid is used, without the addition of water or a sulphate.

To make a battery solution from the above-described compound requires the admixture of water only. Such a compound is easily transported, very soluble and deliquescent, and therefore easily formed into a battery solution merely by the addition of water.

Having thus described my invention, what I claim as new, and desire to secure Letters Patent for, is—

As an article of manufacture, a battery compound consisting of bisulphate of soda and trioxide of chromium, combined substantially in the proportions and manner described.

In testimony whereof I affix my signature in presence of two witnesses.

WM. P. KOOKOGEY.

Witnesses:
EMMA M. GILLETT,
NEWTON B. LOVEJOY.